Patented Mar. 19, 1935

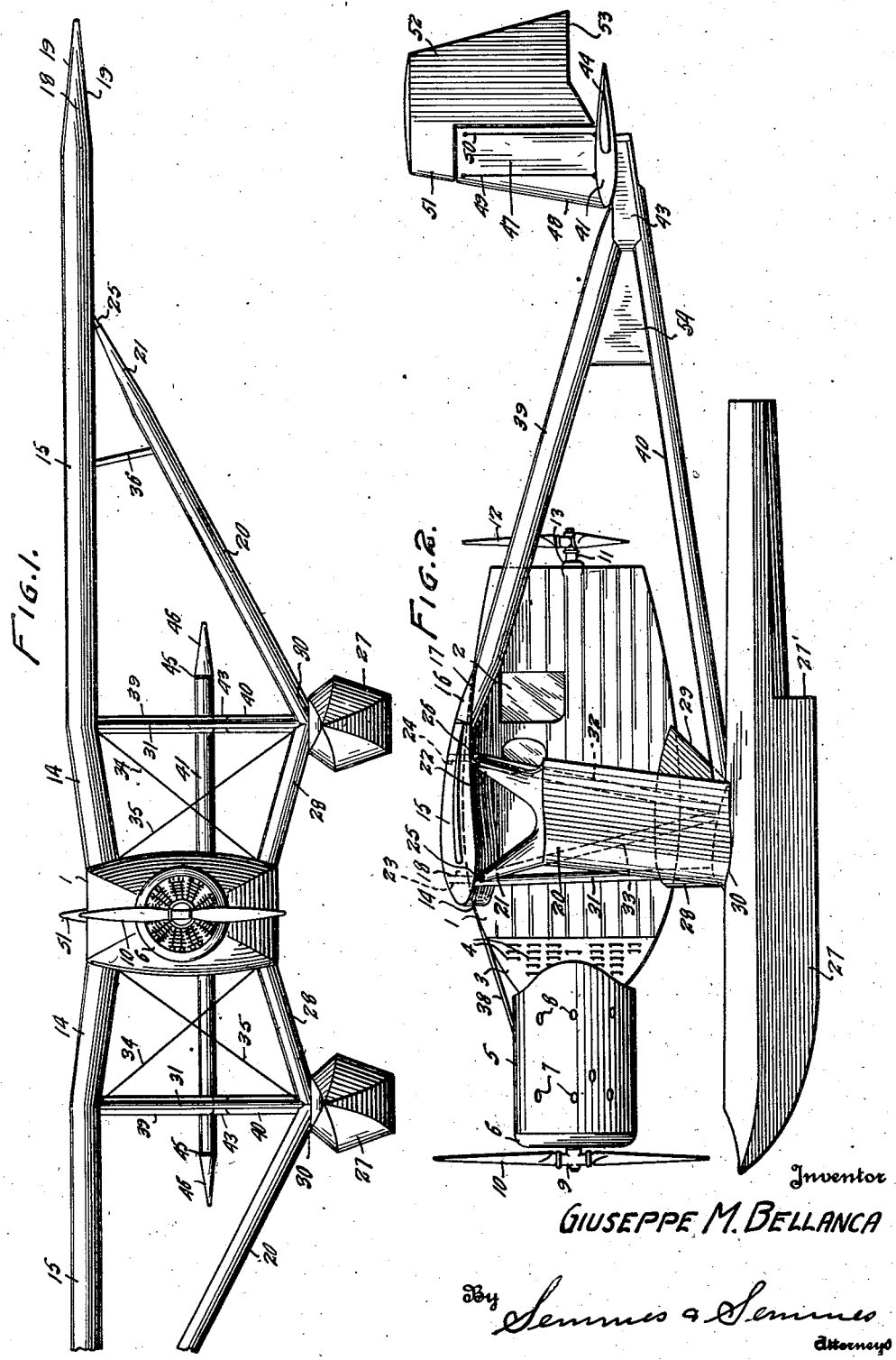

1,995,089

UNITED STATES PATENT OFFICE 1,995,089

SEAPLANE CONSTRUCTION

Giuseppe M. Bellanca, New Castle, Del.

Application October 1, 1931, Serial No. 566,363

8 Claims. (Cl. 244—12)

This invention relates in general to heavier-than-air craft and more particularly has reference to a novel design for seaplanes.

The present invention contemplates a radical departure from the current airplane designs, wherein a single motor is usually mounted in the nose of the fuselage which is continuous with the tail assembly.

For practical purposes there are two types of aircraft; namely, monoplanes and biplanes. Monoplane constructions have been largely adapted in the manufacture of large transport planes and recently have been used as military bombers.

In large aircraft, it is usually necessary to employ a plurality of motors, although in some instances a single power plant might be sufficient. The advantages of a pair or more of motors are obvious in that a seaplane may be sustained in flight with the failure of one or more of the power plants provided if the remainder are capable of developing sufficient horse-power to maintain the plane in flight. In large designs requiring a large number of motors, it is desirable to equip the seaplane with additional reserve power capable of sustaining the plane so that in a similar manner in the event of motor failure flight may nevertheless be continued.

The present invention contemplates a radical departure from the current designs of modern seaplanes. It involves the utilization of a plurality of motors which may be mounted on the longitudinal center of balance of the seaplane, and the provision of a new type of fuselage and airfoils arranged to act in conjunction with the novel tail assembly to provide a seaplane inherently stable in flight, offering a minimum of resistance and capable of being sustained without substantial change in the longitudinal or lateral center of balance with failure of one of the motors.

An object of this invention is to provide a seaplane having a plurality of motors mounted on the longitudinal center of balance of the seaplane.

Another object of this invention is to provide a seaplane driven by tractor and pusher propellers and rotating on the longitudinal center of balance of the seaplane.

Still another object of this invention is to provide a seaplane having stub and strut wings with a pontoon positioned therebetween.

A still further object if this invention is to provide a seaplane having a plurality of motors mounted on the nose of the fuselage having a driving tractor and pusher propellers in the nose and the rear of the fuselage, respectively.

Still another object of this invention is to provide a seaplane having a plurality of motors mounted in tandem under a cowling attached to the nose of the fuselage to permit cooling of both motors.

A further object of this invention is to provide a seaplane having the fuselage terminating adjacent the trailing edge of the wing.

A still further object of this invention is to provide a seaplane having a fuselage terminating adjacent the trailing edge of the wing with a pusher propeller operating in the rear thereof.

Yet another object of this invention is to provide a seaplane having a fuselage terminating adjacent the trailing edge of the wing with a tail assembly in the rear thereof carried on outriggers.

With these and other objects in view, which may be incident to my improvements, the invention consists in the parts and combination to be hereinafter set forth and claimed, with the understanding that the several necessary elements comprising my invention may be varied in construction, proportions and arrangement without departing from the spirit and scope of the appended claims.

The invention broadly comprehends providing pontoons positioned on each side of the fuselage between a stub wing and a strut wing, both of which are constructed of airfoil surfaces. The novel type of seaplane has a fuselage terminating at the trailing edge of the main wing surfaces with a tractor propeller positioned in the front thereof and a pusher propeller positioned in the rear thereof. The tail assembly of the seaplane is carried by out-riggers attached to the main and stub wings.

In order to make my invention more clearly understood, I have shown in the accompanying drawing, means for carrying the same into practical effect without limiting the improvements in their useful applications to the particular constructions, which, for the purpose of explanation, have been made the subject of illustration.

Figure 1 is a front view of the seaplane.

Figure 2 is a side elevational view of the seaplane.

Referring to the numerals in the drawing, wherein like reference characters designate similar parts, a seaplane constructed in accordance with my invention comprises a fuselage 1, substantially twice as high as wide, having curved, flat top and bottom surfaces forming a stream-lined head. The novel type of fuselage has its greatest width at a point substantially one-third of its length from the nose. The remaining two-thirds of the fuselage is tapered to a point in the rear. The side surfaces of the fuselage 1 are rounded and similarly of greatest width at a point substantially one-third the length from the front and tapered to a point at the nose. As shown, the fuselage slightly tapers to a vertical edge in the rear forming the termination thereof.

The fuselage 1 of the novel type of seaplane is divided into compartments. The front portion thereof is adapted to receive a fuel tank and the upper rear portion is designed to serve as a cockpit with windows 2 to permit vision. The rear portion of the lower section may be fitted for a baggage compartment and the central portion lower section is adapted to receive a lubricant tank.

A cowling 3 having a series of baffle ventilators 4 provided therein, is formed at the nose of the fuselage. A tubular cowling 5 encloses a pair of motors mounted in tandem in the nose. The cowling 5 is formed with a rounded rim 6 and two series of peripheral apertures 7 and 8 to allow air to pass around through the front pair of motors.

Attached to the front motor is a shaft 9 having mounted thereon a twin blade tractor propeller 10 operating in front of the rounded portion 6 of the cowling 5. The front motor furnishes the necessary power for driving the shaft 9 which in turn revolves the propeller 10 attached thereto.

The rear motor is adapted to drive a shaft 11 through the central portion of the fuselage having a triple-bladed pusher propeller 12 mounted thereon. The shaft 11 is adapted to extend through a sleeve provided in the fuel compartment and under the front of the operating compartment and above the lubricant tank and is mounted in the central portion of the rear of the fuselage in a bearing 13 adapted to take the direct thrust of the shaft.

It will be seen from the description thus far that a plurality of motors are mounted substantially coincident with the longitudinal axis of the fuselage. These motors operate tractor and pusher propellers in the front and rear of the fuselage, respectively.

Mounted on the sides of the fuselage adjacent the top edge is a pair of top center wing sections 14. As is clearly shown, the trailing edge of the wing sections extends below the top edge of the fuselage. A pair of main wings 15 are attached to the ends of the center wing sections 14 which are angularly mounted with respect to the fuselage. The main wing section 15 is however substantially horizontally mounted.

The main wing sections 15 are provided with ailerons 16 which extend along the entire trailing edge of the main wing sections. The ailerons 16 are tapered at the outer ends as designated by the numeral 17. The outer ends of the wings are also correspondingly tapered as at 18 and the tops and bottoms of the main wing sections are tapered at the outer ends as at 19.

Lift struts 20 reinforce the mounting of the main wing section 15 on the center sections 14. The lift struts 20 are constructed as airfoils and the tops thereof are connected to the under side of the main wing sections. As shown, this connection is accomplished by spars 21 and 22 on the top ends forming continuations of the spars in the leading and trailing edges of the struts but angularly arranged with respect thereto.

The continuations of the spars are suitably covered and stream-lined in the same manner as the struts and are connected to spars 23 and 24 positioned in the wing by suitable fastening devices 25 and 26. As clearly shown, the lift struts 20 which are connected as airfoil surfaces, are of constant chord and thickness.

As shown particularly in Figure 1, stub wing sections 28 are attached to the sides of the fuselage adjacent the lower edges thereof. Preferably, as shown, the stub wings are set at a negative dihedral angle. The lower ends of the struts 20 are suitably connected to the extremities of the stub wings 28 which are outwardly tapered along the trailing edge as is shown in Figure 2 at 29.

Attached to the stub wings 28 and the struts 20 at the points of juncture, are pontoons 27. The pontoons may be attached to the juncture of the stub wing and lift struts as at 30 by any suitable means. The pontoons 27 may be of any suitable structure and are preferably of the hollow V-bow type to give a good cruising value and good freeboard. The pontoon may be constructed of a light weight alloy of low corrodability and high tensile strength such, for example, as the alloy dural. Any suitable wood may also be used. The pontoons are shown with one step 27', but, of course, it will be understood that any number of steps may be employed.

At the tops of the point of juncture between the stub wings and the lift struts, stream-lined struts 31 extend therefrom to connect the under side of the center wing sections adjacent the leading edges and extremities thereof. Similar struts 32 extend from the rear of the juncture points to the under side of the center wing sections adjacent the trailing edges thereof to provide additional strength. The struts 30 and 32 shown in Figure 2, are reinforced by cross struts 33 connected to the under side of the center wing sections adjacent the top of the struts 31 and to the rear of the point of juncture adjacent the bottom of the struts 32. The mounting of the top wing sections and lower stub wing sections is further reinforced by a series of cross guy wires 34 and 35. The mounting of the lift struts on the under side of the main wing sections is reinforced by a cross bar 36 connected between the under side of the main wing sections and on the tops of the lift struts adjacent the ends. It is to be understood that two or more cross bars may be used for reinforcing the mounting of the lift struts. If two cross bars are used, one will be adjacent the leading edge of the wing and the other adjacent the trailing edge of the wing. The other ends of the cross bars will occupy similar positions with respect to the lift struts.

As shown in Figure 2, a plurality of cables 38 suitably anchored in the fuselage, are secured on the motor mounting and extend between the nose of the fuselage and the cowling 5 to lend additional support to the motors.

The tail assembly unit of the seaplane is carried by the top center and lower stub wing sections on top and bottom spars 39 and 40 connected at the joints between the extremities of the main wing sections and the lower stub wings and the wing struts, respectively.

The tail unit consists of a horizontal stabilizer 41 having the front side edges rounded as at 42 and mounted on extremities 43 as shown in Figure 2 connecting the top and bottom pairs of struts forming out-riggers. The horizontal fin is continuous and extends over on each side of the parallel arranged struts and beyond the points in a plane with the stub and center wing sections lying in substantially the same plane as the inner ends and the stub wing sections.

A horizontal fin 44 is pivoted on the trailing edge of the horizontal stabilizing fin and the rear edges of the outer ends might be tapered, if desired. The ends of the elevator fin extending over points past the pivoting, as at 45, are tapered at the extremities, as at 46.

A vertical stabilizing fin 47 having a leading edge tapered downwardly as at 48 is centrally mounted on the center portions of the horizontal stabilizing fin and the mounting reinforced by guy wires 49 and 50. A rudder 52 is pivoted on the trailing edge of the vertical stabilizing fin 47 and has a forward portion 51 extending over the top thereof and forming a continuation of the vertical stabilizing fin when centrally positioned. The bottom of the rudder is cut away as at 53 to allow movement of the elevator without interference with the action thereof. The top of the rudder extends to a point above a point in a plane with the top center wing sections 14.

Mounted between the top and bottom pairs of spars 39 and 40 is a supplemental vertical stabilizing fin 54. The fins 54 lie in a point substantially in a plane with the extremities of the stub wings 28.

It will be understood that the present seaplane presents a minimum resistance to air flow. It is to be understood that where straight line joints are shown, it is within the concept of this invention to fillet the joints in order to reduce air resistance to a minimum.

There is also provided a seaplane having both a tractor and pusher propeller. The pusher propeller is made practical by terminating the fuselage adjacent the trailing edge of the wing.

In constructing the wing in sections, the rigid type of mounting is made possible and by supporting the pontoons between the stub and lift strut wing sections, the shock of landing in the water may be distributed among the several airfoil surfaces by reason of the connection of the top of the joint between the stub wing and the strut wing with the main wing.

The angular disposition of the center and stub wing sections and lift struts allow for a rigid bracing and in addition increase the lateral, as well as the longitudinal, stability of the supplemental flight by reason of the opposed forces set up thereby. In the mounting of the pusher propeller at the rear of the fuselage, the slip stream therefrom is directed on the control surfaces, which increases the responsiveness of the controls.

Generally this invention provides a seaplane carrying a plurality of motors, the weight of which is centered in substantial alignment with the longitudinal axis of the seaplane, which is provided with angularly disposed airfoils, adding to the stability thereof and allowing for secure bracing, in which the shocks incident to landing and taking off are distributed over the wing surfaces generally and in which ready control is afforded by reason of extensive control surfaces generally and in which ready control is afforded by reason of extensive control surfaces directly in the slip stream of the pusher propeller but out of interference therewith.

While I have shown and described the preferred embodiment of my invention, I wish it to be understood that I do not confine myself to the precise details of construction herein set forth by way of illustration, as it is apparent that many changes and variations may be made therein, by those skilled in the art without departing from the spirit of the invention, or exceeding the scope of the appended claims.

I claim:

1. A seaplane comprising a fuselage, top wing sections connected thereto, auxiliary sustaining surfaces extending from the fuselage to the top wing sections, outriggers attached to the wing sections and sustaining surfaces and extending rearwardly therefrom, a tail assembly carried on the outriggers mounted in the rear of the fuselage and pontoons positioned at the juncture of said auxiliary sustaining surfaces said pontoons being connected directly to said outriggers in the plane of the auxiliary sustaining surfaces.

2. A seaplane comprising center, main and stub wing sections, a fuselage terminating adjacent the trailing edges thereof, lift struts of airfoil section extending between the main and stub wing sections, outriggers attached to the trailing edge of each of the main and stub wing sections and extending rearwardly and terminating in an empennage, and a pontoon connected at the juncture of the stub wing and lift strut and one of said outriggers.

3. A seaplane comprising a fuselage, top wing sections connected thereto, auxiliary sustaining surfaces extending from the fuselage to the top wing sections, outriggers attached to the wing sections and sustaining surfaces, a tail assembly carried on the outriggers mounted in the rear of the fuselage with vertical stabilizing fins mounted therebetween, at least one of said outriggers being directly connected to the trailing edge of said auxiliary sustaining surface and pontoons attached to the auxiliary sustaining surfaces in the plane of said connection between the auxiliary sustaining surface and the outrigger.

4. A seaplane comprising a fuselage, center and stub wing sections, the fuselage terminating adjacent the trailing edges thereof, outriggers attached to the extremities of the stub and center wing sections, a tail assembly carried in the rear of the fuselage connected by outriggers to the extremities of the stub and center wing sections and pontoons carried by said stub wing sections.

5. A seaplane comprising a fuselage, a top wing section having a section of lateral dihedral and a horizontal section, a lower stub wing, a pontoon connected with the lower wing in the plane of the joint between the dihedral and horizontal sections, an interplane strut connecting the lower wing with the upper wing in the plane of the joint between said lateral dihedral and horizontal sections of the upper wing, and outriggers attached to the upper and lower wing in the plane of said interplane strut.

6. A seaplane comprising a fuselage, a top wing section having a section of lateral dihedral and a horizontal section, a stub wing, a lift strut connecting said stub wing and the horizontal section of the top wing and a pontoon mounted at the juncture of the stub wing and the lift strut in the plane of the joint between the dihedral and horizontal sections of the main wing.

7. A seaplane comprising a fuselage, a top wing section having a section of lateral dihedral and a horizontal section, outriggers extending rearwardly from the top wing, a tail assembly carried in the rear of the fuselage connected by the outriggers to the joint of the dihedral and horizontal sections of the top wing and a pontoon in the plane of the joint between the dihedral and horizontal sections.

8. A seaplane comprising a fuselage, a top wing section having a section of lateral dihedral and a horizontal section, a stub wing, a lift strut connecting said stud wing and the horizontal section of the top wing, outriggers attached to the top and stub wings and extending rearwardly therefrom, a tail assembly carried in the rear of the fuselage connected by the outriggers to the joint of the dihedral and the horizontal sections of the top wing, and a pontoon mounted at the juncture of the stub wing and the lift strut in the plane of the joint between the dihedral and horizontal sections.

GIUSEPPE M. BELLANCA.